United States Patent [19]
Hollander et al.

[11] Patent Number: 5,399,018
[45] Date of Patent: Mar. 21, 1995

[54] ADJUSTABLE POSITIONING HOUSING ASSEMBLY FOR AN INFRARED THERMOCOUPLE

[75] Inventors: Milton B. Hollander; William E. McKinley, both of Stamford, Conn.

[73] Assignee: Omega Engineering, Inc., Stamford, Conn.

[21] Appl. No.: 40,517

[22] Filed: Mar. 31, 1993

[51] Int. Cl.⁶ .......................... G01J 5/12; G01J 5/04; G01K 1/14;
[52] U.S. Cl. ................................. 374/121; 374/208; 136/230
[58] Field of Search ...................... 374/208, 121, 140; 136/230

[56] References Cited

U.S. PATENT DOCUMENTS

| | | | |
|---|---|---|---|
| 3,347,099 | 10/1967 | Schraeder | 374/140 |
| 3,368,076 | 2/1968 | Clifford | 374/121 |
| 3,374,122 | 3/1968 | Cole | 374/208 |
| 3,463,005 | 8/1969 | Hance | 374/140 |
| 3,673,869 | 7/1972 | Stawarski et al. | 374/140 |
| 4,984,904 | 1/1991 | Nakano et al. | 374/208 |
| 5,044,771 | 9/1991 | Masom | 374/208 |

FOREIGN PATENT DOCUMENTS 0219841 9/1986 Japan .................................. 374/208

Primary Examiner—Diego F. F. Gutierrez
Attorney, Agent, or Firm—Bruce E. Hosmer; Howard S. Reiter

[57] ABSTRACT

A position housing assembly, for a generally cylindrical infra-red thermocouple sensor of the type having a sensing face at one end and one or more electrical conductors extending from the other end, includes a cylindrical housing having a central bore for telescopically receiving a sensor. A conical reflective surface, at one end of the housing, concentrates infra-red rays toward the face of the sensor; the reflective surface may be integral with the housing or it may be carried by a separable adapter. A separable handle attaches to the housing, and extends into the housing wall for guiding conductors from a sensor to the exterior of the housing. A set screw on the housing clamps the sensor within the central bore. Adjustable positioning legs extend axially from the housing to position it relative to a test surface. In one embodiment the legs are attached to a moveable positioning bracket, while in another, the legs slide within axial bores integrally formed in the housing. A clamping screw or screws lock the legs or the movable bracket in position. Rotatable rollers may be provided at the ends of the positioning legs to facilitate movement of the housing along a surface. Calibration marks on the housing or on the legs further facilitate positioning of the legs relative to the housing.

15 Claims, 2 Drawing Sheets

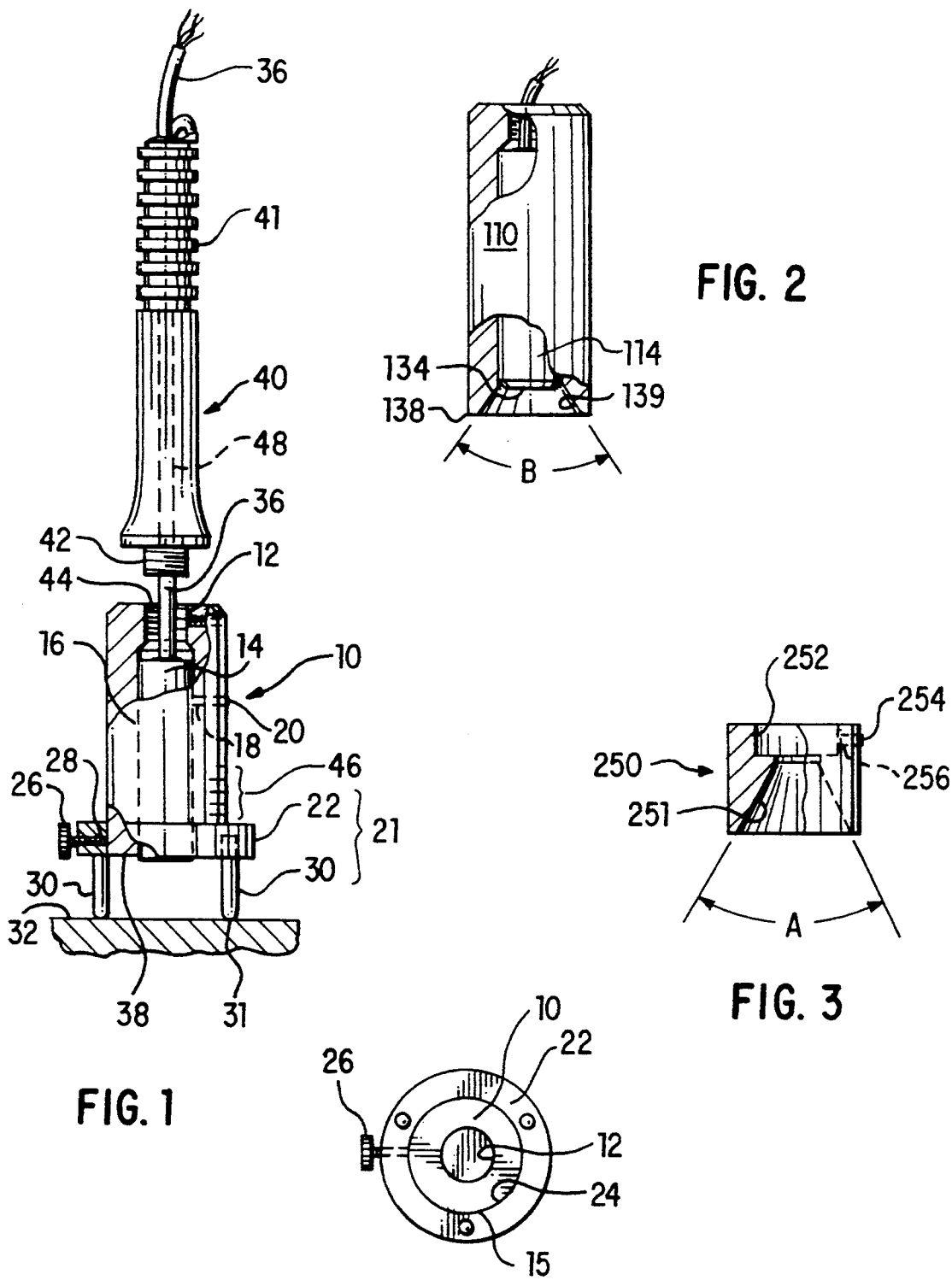

ADJUSTABLE POSITIONING HOUSING ASSEMBLY FOR AN INFRARED THERMOCOUPLE

BACKGROUND OF THE INVENTION

This invention relates generally to infrared sensors and more specifically, to adjustable housing assemblies for supporting and enhancing the use of such sensors.

Infrared sensor devices are widely used in industry and science for sensing and measurement of temperature conditions in various environments. Because such sensor elements are usually small, fragile and generally difficult to handle, they are most often sold as a unit encapsulated in a cylindrical outer case. The case provides physical and mechanical protection for the elements of the sensor. In this form, the sensing face of the infrared sensor is located at one axial end of the cylindrical case, while electrical conductor leads coupled to the internal circuitry of the sensor extend from the case at or near the opposite end.

In accordance with established prior art usage, infrared sensors are mounted in fixed locations relative to a test surface or area having a temperature characteristic which is to be monitored. Mounting is accomplished by means of a bracket having various gripping or clamping means of obvious or well-known design. The bracket or other support is attached to any suitable, appropriately located surface, such as a fixed portion of a related apparatus, or a portion of the building or other structure in which the sensor or related apparatus is housed. The sensing face of the sensor is aimed at a desired portion of the surface that is being monitored. The distance between the sensing face and the monitored test surface is selected so as to control the total amount of surface area that falls within the sensors "field of vision".

Infrared sensors have not been used in portable or hand-held applications previously, because their proper operation requires known and accurate positioning relative to the surface being monitored. The accuracy, reliability and overall usefulness of sensor signals are directly dependent upon precise determination of the distance between the sensor face and the monitored surface. If the distance is greater than intended, erroneous low temperature readings are likely to result, whereas if the distance is less than desired, unjustified high temperature signals may be produced or the sensor may fail to monitor the proper area of the surface that is being monitored.

SUMMARY OF THE INVENTION

Accordingly, it is an object of this invention to provide a support for an infrared temperature sensor that is fully portable.

It is another object of this invention to provide a portable support for in an infrared temperature sensor that can be positioned accurately and reliably relative to a test surface location.

It is another object of this invention to provide a portable support for in an infrared temperature sensor that can be positioned adjustably and precisely relative to a test surface location.

It is another object of this invention to provide a portable support for in an infrared temperature sensor in which the sensor is releasably retained, conveniently, in a predetermined and desired position within the housing.

It is another object of this invention to provide a portable support for in an infrared temperature sensor having means for enhancing the reception of radiation at the sensor face.

A feature of this invention is a portable housing having a substantially central axial opening for receiving an infrared sensor case, and further having a reference surface on the exterior thereof for positioning the housing accurately and reliably relative to a test surface for monitoring purposes.

Another feature of this invention is a portable housing having a frusto-conical opening at one end of the central opening for enhancing and directing infrared information toward the face of a sensor positioned within the central opening.

Another feature of this invention is a portable housing having an exterior reference surface defined by the tips of telescopically extendible legs that can be adjusted to position the housing at a selected distance from a test surface.

Another feature of this invention is a portable housing having a threaded screw clamp for releasably retaining a sensor case within the housing in a desired relative location.

These, and other and further objects, features and advantages of this invention will be made evident to those having ordinary skill in this art by the following specification considered with reference to the accompanying drawings, in which:

BRIEF DESCRIPTION OF THE DRAWINGS

FIG. 1 is a front elevation view of a preferred embodiment of the invention, shown partially in cross-section, with an infrared sensor in installed position;

FIG. 2 is a front elevation view of an alternate embodiment of a housing in accordance with this invention, shown partially in cross-section;

FIG. 3 is a partially sectioned elevation view of an improvement in the form of an adapter usable with the embodiments of the invention shown in FIGS. 1 and 2;

FIG. 4 is a bottom plan view of the embodiment of the invention shown in FIG. 1;

DETAILED DESCRIPTION OF THE INVENTION

Figure 5:
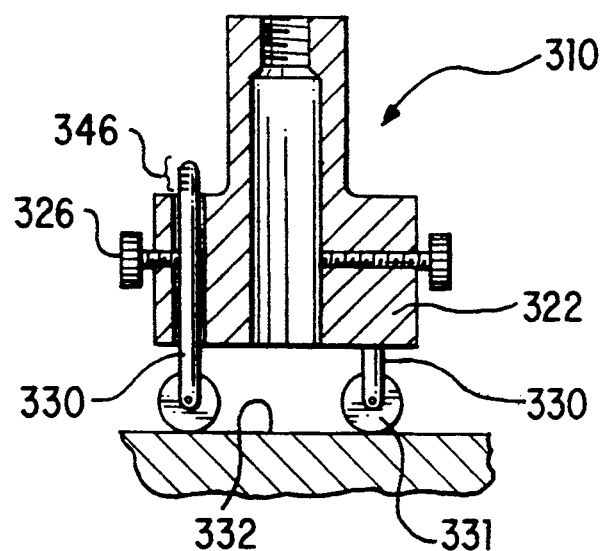
FIG. 5 is a fully cross-sectioned elevation view of the housing member for a third embodiment of the invention.

Referring now more particularly to the drawings, the adjustable positioning assembly for an infrared sensor, shown in FIG. 1, may be seen to comprise a positioning housing member 10 having a central axial opening 12, a handle member 40 separably attached to the housing 10 by means of a threaded male projection portion 42 at one end of the handle and a mating female receptacle portion 44 on the housing, and a positioning structure comprising a positioning bracket 22 and positioning legs 30.

Central opening 12 within housing 10 is shaped and dimensioned for telescopically enclosing an infrared sensor case 14. Case 14 is shown here positioned within central opening 12 for purposes of illustration, only. It should be understood readily that this invention is intended to receive and to interact with a sensor such as case 14, but the sensor does not otherwise represent a necessary or essential part of the invention. A sensor case such as 14 characteristically includes a sensing face 34 at one end and one or more wire conductors 36 extending from the other end which serve to establish electrical connections with the internal electrical elements (not shown) of the sensor. In use, the sensor 14 is positioned within housing 10 so that the sensing face 34 is located in a known, predetermined relationship with the positionable end face 38 of the housing 10.

The locating assembly 21, in the embodiment of FIG. 1, comprises a locating bracket 22 in the form of an encircling toroidal element having a suitably dimensioned central opening 24 telescopically receiving and engaging the outer surface 16 of housing member 10, as shown in FIG. 1 and FIG. 4. Bracket 22 is further provided with a set screw 26 threadedly engaged in a threaded opening 28, to serve as a clamping means for locking the bracket in a desired axial position relative to housing 10. Clamping is accomplished in a manner similar to the retention of a sensor 14 within opening 12, but it should be understood readily that other forms of clamping mechanisms may be substituted within the scope of this invention. Extending in radially spaced-apart, substantially parallel relationship from bracket 22, in a direction substantially parallel to the central axis of opening 12, are three positioning legs 30. The positioning legs extend in a substantially axial direction a predetermined distance from the plane of bracket 22 so as to support housing member 10 in a known position relative to a surface that is to be monitored, such as surface 32, shown schematically in FIG. 1. In this regard, the free ends 31 of positioning legs 30 serve as reference surfaces for engaging a monitored surface 32, to exactly locate sensor face 34 relative to the monitored surface. Although three legs are shown because they are believed to represent the most stable form of support on a planar surface, it should be understood that any number of legs may be used as desired, and if free-standing support is not considered necessary in some applications, it is entirely possible for the housing assembly to be accurately and satisfactorily positioned relative to a monitored surface using one positioning leg, only, while the assembly is manually held and stabilized by the user.

To further enhance the operation of the locating assembly 21, housing 10 may be provided with calibration markings 46 spaced along the length thereof to permit reproducible positioning of bracket 22 relative to the housing. If desired, the markings 46 may be correlated to the dimensions of bracket 22 and positioning legs 30 to reflect the actual distance between reference surfaces 31 and either the end face 38 of housing 10 or the sensing face 34 of sensor 14. In a related manner, the position of sensing face 34 relative to end face 38 may be precisely determined by means of set screw 20 as will be explained below; calibration markings 46 may be chosen accordingly to reflect the actual distance between reference surfaces 31 and sensing face 34 of a sensor 14 positioned within housing 10.

Housing 10 may be formed of any suitable structural material such as molded plastic or shaped metal or metal alloy. The outer wall 16 of housing 10 includes a generally radially oriented threaded-through aperture 18 having a set screw 20 threadedly engaged therein. Set screw 20 may be advanced, by rotation within aperture 18, toward and away from the central axis of central axial opening 12, as a means for gripping or releasing a sensor case 14 within opening 12. Case 14, accordingly, may be firmly retained within opening 12 at a desired axial location relative to housing member 10. Although set screw 20 is shown to be of the recessed, "headless" variety, it should be understood that other varieties of clamping screws may be substituted.

To facilitate handling and positioning of the housing assembly relative to a monitored surface 32, housing element 10 is provided with a projecting handle 40 having a grip portion 41 of any suitable known configuration, and with a coupling in the form of a threaded male element 42 for attaching the handle to the housing 10 by engagement with internally threaded female receptacle portion 42 in housing 10. A central passage 48 extends axially through handle 40 to provide a conduit for guiding one or more conductors 36 from the end of a sensor 14, to the exterior of the housing. In the alternative embodiment of a housing 110, shown in FIG. 2, the end face 138 of the housing is provided with a recessed internal frusto-conical reflective surface 139, opening outwardly to the exterior of the housing in axial alignment with the axis of a sensor 114 received in the housing. The frusto-conical face is characterized by an included (apex) angle B that is preferably within the range of 70 degrees to 150 degrees, so as to enhance the emissivity of the monitored surface to and to achieve the most effective sensing of the monitored surface at the sensing face 134 of an inserted sensor 114. The reflectivity of frusto-conical surface 139 is selected in accordance with known characteristics of infrared sensors to provide the most effective transmission of infrared radiation from a monitored surface to the sensing face of a mounted sensor.

FIG. 3 represents an adapter 250 that may be used with housings such as those shown in FIGS. 1 and 2 to provide a reflectivity-enhancing frusto-conical surface 251 for a housing which does not include one, such as housing 10 in FIG. 1, or to change the characteristics of a housing that does include one, such as surface 138 in housing 110 of FIG. 2. The surface may have a mirror-like reflective finish. Surface 251 is characterized by an included angle A which may differ from angle B while remaining within the range previously identified. At the end of adapter 250 opposite surface 251, the adapter is provided with a recessed opening 252 dimensioned to telescopically receive the open end 38 or 138 of housings 10 or 110 respectively, to align surface 251 axially with the sensing face of a sensor case located within either of the housings. A clamping screw 254 may be mounted to the adapter within a threaded bore 256 to attach the adapter to an inserted housing by clamping against the outer wall, such as wall 16 of housing 10.

Figure 6:
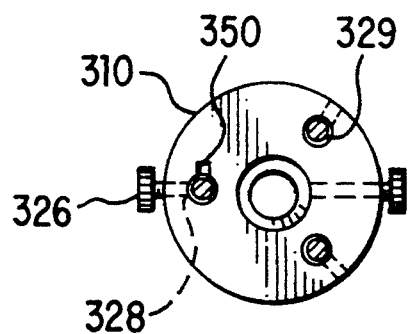
FIG. 6 is a partial bottom plan view of the housing member portion of the embodiment illustrated in FIG. 5.

FIGS. 5 and 6 illustrate an embodiment of a housing 310, in which a locating bracket 322 is formed integrally with the housing, and one or more positioning legs 330 are telescopically received within corresponding bores 329. The legs 330 may be clamped at any desired position relative to the housing by means of clamping screws 326 set into correspondingly threaded set screw-bores 328. As an alternative to the plain ends 31 of legs 30 shown in FIG. 1, legs 330 may be provided with reference surfaces in the form of rotatably mounted wheels 331. To help assure proper alignment of the wheels for satisfactory rolling engagement with a monitored surface such as 332, bores 329 may be formed with key ways 350, and legs 330 with corresponding splines (not shown) of known design, to "polarize" the radial alignment of the legs relative to the housing. If desired, legs 330 may be provided with calibration markings 346, for the purpose previously described with reference to FIG. 1.

Although various specific embodiments of this invention have been described and illustrated herein, it will be obvious to those of skill in this art that various other fully equivalent embodiments consistent with the invention are possible and evident within the scope of this disclosure.

What is claimed is:

1. A positioning housing assembly, for an infrared thermocouple sensor of the type having a generally cylindrical sensor case with a sensing face at one axial end thereof for sensing a condition of an external object and at least one electrical conductor at the other end thereof, said positioning housing comprising:
    an elongate cylindrical housing body, having an outer wall, and an axial opening therein for telescopically receiving a sensor case;
    said axial opening having at one end thereof a frusto-conical surface portion formed by an axial wall portion of said cylindrical body, for guiding infrared rays toward the sensing face of the sensor case disposed within said axial opening;
    said cylindrical body having passage means proximate the end thereof remote from said frusto-conical surface for guiding the at least one electrical conductor from the interior of said body to the exterior thereof;
    gripping means coupled to said cylindrical body and operable within said axial opening for restricting axial relative motion between said cylindrical body and the sensor case disposed within said axial opening;
    reference surface means on the exterior of said cylindrical body at the end thereof proximate to said frusto-conical surface, for positioning said housing with reference to an external object;
    said gripping means being adjustable to position the sensing face of the sensor case in a desired axial position within said axial opening relative to said reference surface means, so that the position of the sensing face of the sensor case within said axial opening relative to a given surface of said external object will be determined by the position of the sensor case relative to said reference surface means.

2. A positioning housing in accordance with claim 1 wherein: said frusto-conical surface is characterized by a mirror-like reflective finish.

3. A positioning housing in accordance with claim 1, wherein said reference surface means is a plurality of axially extendible legs movable relative to said cylindrical body.

4. A positioning housing in accordance with claim 3 wherein said extendible legs are provided with index markings to permit selection of a desired extension of said legs relative to said cylindrical body.

5. A positioning housing in accordance with claim 3, wherein said reference surface means further includes a radial projection in the form of a substantially continuous peripheral flange extending from the outer wall of the cylindrical body and having receiving bores therein telescopically receiving said extendible legs, and a set screw for each leg threaded through said projection and extending into said receiving bore for clamping each leg in a predetermined extended position.

6. A positioning housing in accordance with claim 1, wherein said reference surface means is an axially extendible leg member movable relative to said cylindrical body.

7. A positioning housing in accordance with claim 6 wherein said extendible leg is provided with index markings to permit selection of a desired extension of said leg relative to said cylindrical body.

8. A positioning housing in accordance with claim 6, wherein said reference surface means further includes a radial projection extending from the outer wall of the cylindrical body and having a receiving bore therein telescopically receiving said extendible leg, and a set screw threaded through said projection and extending into said receiving bore for clamping the leg in a predetermined extended position.

9. A positioning housing in accordance with claim 1 wherein said reference surface means comprises at least one roller member extending beyond the end of said cylindrical body at the end proximate to said frusto-conical surface, and having an axis of rotation substantially transverse to the axis of said central axial opening.

10. A positioning housing in accordance with claim 1 wherein said gripping means is a set screw threaded through the wall of said cylindrical body and threadedly extendible into said axial bore.

11. A positioning housing in accordance with claim 1 wherein said frusto-conical surface is defined by a cone-shape having an apex angle not substantially less than 70 degrees.

12. A positioning housing assembly in accordance with claim 1, further comprising an adapter having a body member having an axial central opening therethrough;
    said body member having a recessed, internal reflective frusto-conical surface formed at one end of said axial central opening therethrough, said surface on said body member diverging outwardly from the interior of said body member to the exterior thereof in substantial axial alignment with said axial central opening; and
    a recess formed in said body member at the opposite end of said axial central opening, said recess being dimensioned to telescopically receive and engage the outer wall of said housing body at one end thereof to surround the sensor face of an inserted sensor case with said frusto-conical reflective surface.

13. A positioning housing in accordance with claim 1 further including handle means separably coupled to the cylindrical body and having conductor guide means cooperating with said conductor passage means for guiding the at least one electrical conductor from within said axial bore to the exterior of said handle at a location remote from the exterior of said cylindrical body.

14. A positioning housing in accordance with claim 13 wherein said conductor passage means includes a threaded bore portion and said handle means includes an extending threaded stud portion threadedly engagable with said threaded bore portion for separably coupling said handle means to said cylindrical body.

15. A positioning housing in accordance with claim 1 wherein said cylindrical body includes first and second axial portions, and said reference surface means and said frusto-conical surface are formed on said second axial portion which may be detached from said first axial portion for replacement with substitute axial portions having desired and predetermined dimensional and reflectivity characteristics.

* * * * *